United States Patent
Dong et al.

(10) Patent No.: US 9,246,326 B2
(45) Date of Patent: Jan. 26, 2016

(54) METHOD AND SYSTEM FOR ONLINE FERRORESONANCE DETECTION

(75) Inventors: Xinzhou Dong, Beijing (CN); Xuyang Li, Beijing (CN); Zhiqian Bo, Bath and North East Somerset (GB); Ray Chatfield, Staffordshire (GB); Andrzej Klimek, British Columbia (CA)

(73) Assignees: ALSTOM TECHNOLOGY LTD., Baden (CH); TSINGHUA UNIVERSITY, Beijing (CN)

( * ) Notice: Subject to any disclaimer, the term of this patent is extended or adjusted under 35 U.S.C. 154(b) by 496 days.

(21) Appl. No.: 13/701,194

(22) PCT Filed: Oct. 5, 2010

(86) PCT No.: PCT/EP2010/064847
§ 371 (c)(1),
(2), (4) Date: Mar. 11, 2013

(87) PCT Pub. No.: WO2011/150985
PCT Pub. Date: Dec. 8, 2011

(65) Prior Publication Data
US 2013/0166493 A1    Jun. 27, 2013

(30) Foreign Application Priority Data
Jun. 2, 2010  (CN) .......................... 2010 1 0192266

(51) Int. Cl.
*H02H 9/00*  (2006.01)
*G06N 5/00*  (2006.01)
*G06N 5/04*  (2006.01)
*H02H 1/00*  (2006.01)

(52) U.S. Cl.
CPC ............... *H02H 9/007* (2013.01); *G06N 5/048* (2013.01); *H02H 1/0092* (2013.01)

(58) Field of Classification Search
CPC .................................... H02J 1/02; G06N 7/02
See application file for complete search history.

(56) References Cited

U.S. PATENT DOCUMENTS

| 4,713,553 | A |   | 12/1987 | Townsend |        |
|-----------|---|---|---------|----------|--------|
| 6,157,552 | A | * | 12/2000 | Kern et al. | 363/39 |

FOREIGN PATENT DOCUMENTS

EP    2128950 A1    12/2009

OTHER PUBLICATIONS

O. Youssef, "Combined Fuzzy-Logic Wavelet-Based Fault Classification Technique for Power System Relaying", IEEE Trans. on Power Delivery, vol. 19, No. 2, Apr. 2004, pp. 582-589.*
Y. Qin and S. Du, "How Fuzzy Logic can Improve the Performance of Uninterruptible Power Systems", IEEE Conf. Proc.: Applied Power Electronics Conference and Exposition, 1993, pp. 540-542.*
International Search Report for PCT/EP2010/064847; Jan. 31, 2011.

(Continued)

*Primary Examiner* — Kakali Chaki
*Assistant Examiner* — Vincent Gonzales
(74) *Attorney, Agent, or Firm* — Pearne & Gordon LLP

(57) ABSTRACT

The invention concerns a method and a system for online ferroresonance detection in a high voltage electrical distribution network. The method includes:
  Overflux detection (23), which acts as the start element, overflux being set if the flux is greater than a threshold for specified time duration,
  mode verification (26) which is to recognize the modes of the ferroresonance, a fuzzy logic method being used to discriminate the ferroresonance modes.

15 Claims, 2 Drawing Sheets

(56) References Cited

OTHER PUBLICATIONS

Rezaei-Zare, A., et al. "Analysis of Ferroresonance Modes in Power Transformers Using Preisach-Type Hysteretic Magnetizing Inductance"; In: IEEE Transactions on Power Delivery, vol. 22, No. 2; Apr. 2007; pp. 919-929.

"Ferro-Resonance Alarm Relay Type XR309"; Fact Sheet, Reyrolle protection, 1996, Roll-Royce; 2 pgs.

* cited by examiner

METHOD AND SYSTEM FOR ONLINE FERRORESONANCE DETECTION

BACKGROUND OF THE INVENTION

1. Field of the Invention

This invention relates to a method and a system for online ferroresonance detection, especially of power transformer ferroresonance.

2. Description of the Related Art

Ferroresonance is a phenomenon that is the occurrence of an unstable high voltage, typically on three phase electrical systems, which only occurs under specific conditions.

Ferroresonance is a very dangerous phenomen for transformer feeder or mesh corner and tee connection constructions where there is a double overhead line section.

Indeed, when a transformer feeder is disconnected from the rest of a power system, the transformer may be driven into saturation due to discharge of the capacitance-to-earth of the isolated system. Ferroresonance may then occur between the reactive components, said ferroresonance being maintained by energy transferred from the coupling capacitance of the parallel line which remains on load. When there is ferroresonance, the re-energized transformer can cause severe switching overvoltages. Therefore a ferroresonance detection and alarm device is essential.

Ferroresonance is a complicated nonlinear electrical resonant phenomenon, which is caused by saturable inductance of a transformer coupling with system capacitance. This phenomenon, which can take place for a wide range of situations in power systems, is very dangerous for power systems due to overvoltages, overcurrents and the abnormal rate of harmonics it bring about, which may cause dielectric and thermal destructions, reduction in performance and lifetime of insulators, failure of the equipment (e.g. untimely tripping of the protection devices), premature ageing of the electrical equipments, even breakdown of whole system.

The main characteristic of ferroresonance is that it is highly sensitive to system parameters and initial conditions, which makes it is hard to be predicted.

There are four different modes of ferroresonance according to the shape and frequency of its voltage, said modes are the fundamental mode, the subharmonic mode, the quasi-periodic mode and the chaotic mode. The fundamental and subharmonic modes are more frequent than the other two in power system.

Conventional UK practice has been to fit ferroresonance detection which automatically initiates isolation of the transformer from the de-energized line by operation of an open terminal disconnector at the onset of ferroresonance: when de-energized, if two out of three phases voltages remain high, the alarm will be issued.

The document referenced [1] at the end of the description describes a protection relay (XR 309) made by the Reyrolle company. On supergrid systems, ferroresonance may be experienced following de-energisation of a directly connected transformer. Ferroresonance may be sustained by the induction from an energized parallel circuit. Re-energising the transformer whilst in a ferroresonant state can risk severe switching overvoltages, therefore where there is such a risk a ferroresonance alarm relay is essential. So the relay XR 309 detect ferroresonance, with the system energized or de-energised, as follows:

On system de-energisation, the secondary voltage falls below the reset level, and three elements drop-off. In the event of ferroresonance occurring, two out of three elements will remain energized.

If ferroresonance is induced onto a de-energised system, the relay will only respond if the amplitude of ferroresonance is above the relay element pick-up level of 40V AC.

Relay contacts are wired to initiate a timer, which in turn will initiate the alarm.

This prior art method cannot cover all ferroresonance situations: for example the only phase high voltage case in the electrical rail circuits. Another shortcoming of this relay is that it is not numerical but analog. Therefore it cannot be incorporated into the new protection relays.

The invention is related to the detection of ferroresonance and determination of the mode of said ferroresonance, especially in transformer feeder connection conditions, or equivalent, such as mesh corner and circuit tee connections, where a section of double circuit overhead lines exists.

The purpose of the invention is to obtain an accurate detection and mode recognition of ferroresonance, in focusing on its most distinctive feature, which is transformer iron core saturation, and its spectrum performance.

SUMMARY OF THE INVENTION

The invention concerns a method for online ferroresonance detection in a high voltage electrical distribution network, characterized in that it comprises:

overflux detection, which acts as a start element, overflux being set if the flux is greater than a threshold for specified time duration, mode verification, which is to recognize the modes of the ferroresonance, a fuzzy logic method being used to discriminate the ferroresonance modes.

Advantageously the invention method is a method for ferroresonance detection for the power transformer feeder conditions.

Advantageously in said method, for ferroresonance detection, the flux is derived from integration of voltage with elimination of the DC component, and then compared to an adaptive threshold to determine whether there is overflux or not.

Advantageously many frequency components are calculated when an overflux is detected, then many (for example 20) latest values of the frequency components are stored, a stable state or an unstable state being determined first by comparing the sum of the standard deviation of each frequency component and the sum of the expectations of each frequency component. If the state is unstable and lasts for a specified time duration, the chaotic mode is verified, and if the state is stable, a fuzzy logic is applied to discriminate the ferroresonance modes.

Advantageously the frequency components are: 1/5 subharmonic component, 1/3 subharmonic component, 1/2 subharmonic component, fundamental component and $3^{rd}$ harmonic component.

Advantageously the fuzzy logic uses a selfdefined "large" membership function, each component's value at the same instance being fuzzified through said function, The rules being as follows:

If C1 is large and C3 is large too, then it's fundamental mode;

If C1 is large and C3 is not large, then it's normal state;

If C1 is not large and C1/2 is large, then it's 1/2 subharmonic mode;

If C1 is not large and C1/3 is large, then it's 1/3 subharmonic mode;

If C1 is not large and C1/5 is large, then it's 1/5 subharmonic mode;

C1, C3 being the components of fundamental and 3rd harmonic respectively; C1/2, C1/3, C1/5 being the components of 1/2, 1/3, 1/5 subharmonics respectively. The value of "not large" equals "1-large". The rules' antecedents will be calculated by "MIN" operator. The defuzzification will be achieved by taking the corresponding mode of the rule with highest antecedent as the result; if more than one rules with the highest antecedent the result will be chaotic mode.

Advantageously a mode is verified if said mode takes place more than 15 out the latest values.

Advantageously the flux is being monitored all the time, and if two out of three phases fluxes fall below a threshold, the transformer feeder is regarded as de-energized. At such situation, the threshold for overflux and mode verification is halved.

Advantageously the method comprises the following steps:
 sampling voltage and
 on a first way:
 flux calculation,
 threshold adjustment,
 overflux detection,
 overflux alarm,
 on a second way:
 component calculation,
 mode verification,
and then:
 counting,
 report.

The invention also concerns a system for electrical distribution network, characterized in that it comprises:
 Overflux detection means which acts as the start element, overflux being set if the flux is greater than a threshold for specified time duration,
 Mode verification means to recognize the modes of the ferroresonance, which comprise a fuzzy logic means to discriminate the ferroresonance modes.

Advantageously said system comprises means for deriving the flux from integration of voltage with elimination of the DC component, and means for comparing it to an adaptive threshold to determine whether there is overflux or not.

Advantageously the system comprises means for calculating many frequency components when an overflux is detected, and means for storing many latest values (for example 20), a stable state or an unstable state being determined first by comparing the sum of the standard deviation of each frequency component and the sum of the expectations of each frequency component. If the state is unstable and lasts for a specified time duration, the chaotic mode is verified, and if the state is stable, a fuzzy logic is applied to discriminate the ferroresonance modes.

Advantageously the frequency components are: 1/5 subharmonic component, 1/3 subharmonic component, 1/2 subharmonic component, fundamental component and $3^{rd}$ harmonic component.

Advantageously the fuzzy logic uses a selfdefined "large" membership function, each component's value at the same instance being fuzzified through the function, the rules being as follows:
 If C1 is large and C3 is large too, then it's fundamental mode;
 If C1 is large and C3 is not large, then it's normal state;
 If C1 is not large and C1/2 is large, then it's 1/2 subharmonic mode;
 If C1 is not large and C1/3 is large, then it's 1/3 subharmonic mode;
 If C1 is not large and C1/5 is large, then it's 1/5 subharmonic mode;

C1, C3 being the components of fundamental and 3rd harmonic respectively; C1/2, C1/3, C1/5 being the components of 1/2, 1/3, 1/5 subharmonics respectively. The value of "not large" equals "1-large". The rules' antecedents will be calculated by "MIN" operator. The defuzzification will be achieved by taking the corresponding mode of the rule with highest antecedent as the result; if more than one rules with the highest antecedent the result will be chaotic mode.

Advantageously one mode is verified if said mode takes place more than 15 out the latest values.

Advantageously the flux is being monitored all the time, and if two out of three phases fluxes fall below a threshold, the transformer feeder is regarded as de-energized. At such situation, the threshold for overflux and mode verification is halved.

Advantageously the system comprises successively:
 a filter receiving a voltage input,
 an A/D converter,
 a data storage,
 a processor,
 an amplifier,
 an alarm output device, which outputs an alarm output,
and also comprises an user interface connected to the processor.

The invention makes it possible to detect the occurrence of ferroresonance online, which is applicable on power transformers. The invention uses the overflux as start element, in evaluating the different feature frequencies components with a fuzzy logic method to verify the occurrence of ferroresonance meanwhile determining its mode. Based on combination of overflux detection and mode verification, the invention can overcome the difficulties of conventional relaying algorithm and fills the blanks of the numerical ferroresonance detection method.

Advantageously the invention can be incorporated into a new digital protection relay. It is more sensitive and accurate, in covering all the cases and modes of ferroresonance especially on power transformer.

DESCRIPTION OF THE PREFERRED EMBODIMENTS

Figure 1:
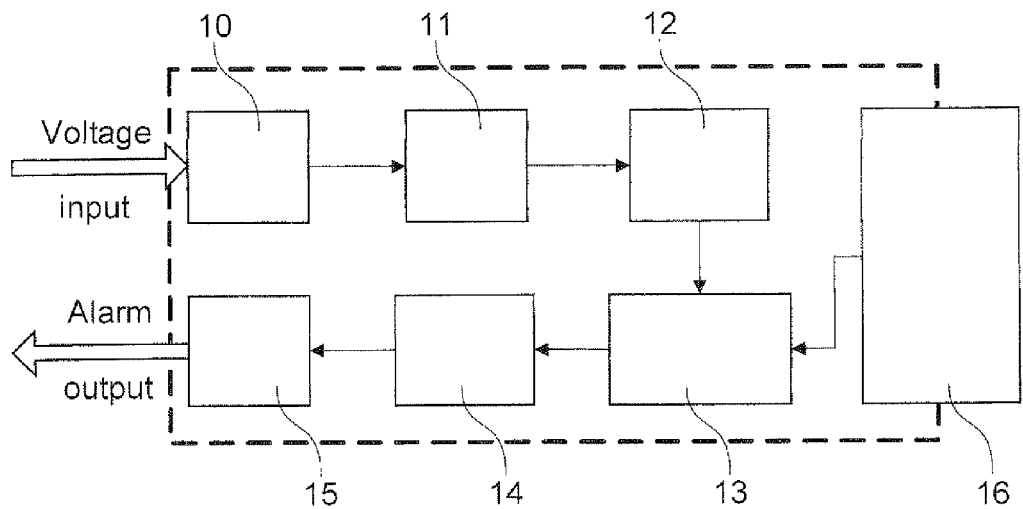
FIG. 1 is a block diagram of the invention system.

The invention scheme is based on overflux detection and frequency components evaluation. Saturation of iron core inductance is a premise to ferroresonance. So overflux is a good indicator of ferroresonance. Based on the 150 Hz, 50 Hz, 25 Hz, $16^{2/3}$ Hz, 10 Hz components of the voltage, with 50 Hz as the fundamental system frequency (or on 180 Hz, 60 Hz, 30 Hz, 20 Hz and 12 Hz with 60 Hz), a fuzzy logic method is used to determine the mode of ferroresonance. If the flux keeps high for a specified time with distorted voltage waveform, ferroresonance is assumed to have occurred.

1) Overflux Detection

There are several ways to detect overflux, for example to detect $V/f > V_n/f_n$ (V: voltage, f: frequency) or to detect the $5^{th}$ harmonic. But, due to the distortion of the waveform and subharmonic mode of ferroresonance, such methods are not applicable for the overflux detection in ferroresonant condition. The invention scheme adopts another approach, which is a direct calculation of flux by integration of voltage.

$$flux = \int_{t_0}^{t} u\,dt + flux_0 \quad (1)$$

The initial value of the flux being not known, the DC component of the flux is removed through the following formula:

$$flux_{DC} = \frac{1}{T}\int_{t-T}^{t} flux\,dt \quad (2)$$

$$Flux = flux - flux_{DC} \quad (3)$$

This operation also can avoid interference of the inrush current caused overflux.

The magnitude of the flux can be obtained by the following formula:

$$Mag_{flux} = \sqrt{\frac{1}{T}\int_{t-T}^{t} Flux^2\,dt} \quad (4)$$

When the flux is greater than a threshold (1.2 by default), it is said to be an overflux. The components starts to be calculated. If this situation lasts for a specified time duration, one overflux alarm is then issued to initiate the mode verification part.

2) Mode Verification

There are several modes of ferroresonance: the fundamental mode, the subharmonic mode, the quasi-periodic mode and the chaotic mode. The mode verification determines the mode of the ferroresonance. Fundamental frequency, 3rd harmonic, 1/2 sub-harmonic, 1/3 sub-harmonic, and 1/5 sub-harmonic components are calculated by DFT (Discrete Fourrier Transform). The mode verification is based on evaluation of these frequency components.

Due to the unpredictable and changeable feature of ferroresonance, a fuzzy logic is used to determine the mode.

With the latest 20 values of each frequency component calculated, a 5*20 matrix is formed, which has the following aspect:

| Components | Time | | | |
|---|---|---|---|---|
| | $T_0 + \Delta t$ | $T_0 + 2\Delta t$ | ... | $T_0 + 20\Delta t$ |
| Fundamental | $C_1(1)$ | $C_1(2)$ | ... | $C_1(20)$ |
| $3^{rd}$ harmonic | $C_3(1)$ | $C_3(2)$ | ... | $C_3(20)$ |
| 1/2 Subharmonic | $C_{1/2}(1)$ | $C_{1/2}(2)$ | ... | $C_{1/2}(20)$ |
| 1/3 Subharmonic | $C_{1/3}(1)$ | $C_{1/3}(2)$ | ... | $C_{1/3}(20)$ |
| 1/5 Subharmonic | $C_{1/5}(1)$ | $C_{1/5}(2)$ | ... | $C_{1/5}(20)$ |

For each row or component, the expectation and the standard deviation are calculated. If the sum of the standard deviation of the five rows divided by the sum of the expectation of the five rows is greater than a determined threshold, the considered state is regarded as unstable pre-chaotic state. If this unstable pre-chaotic state continues for specified time duration it is regarded as chaotic ferroresonance. Otherwise if the considered state is stable, a simple fuzzy logic algorithm is applied to get the mode information.

Figure 2:
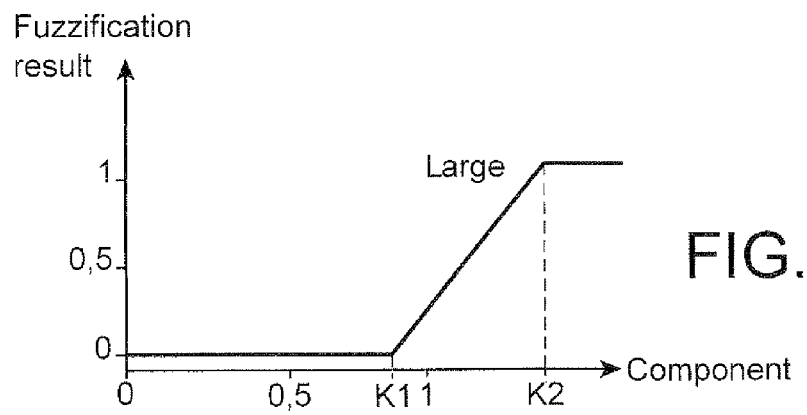
FIG. 2 is a "large" membership function.

Each value is fuzzified by a "large" membership function as shown on FIG. 2.

The definition of such a function is the following one:

$$M(C_N) = \begin{cases} 0 & C_N \leq K_1 \\ (K_2 - K_1) \times (C_N - K_1) & K1 < C_N \leq K_2 \\ 1 & K2 < C_N \end{cases}$$

While M is the "large" value of Cn, K1 and K2 are two inflection points for this function. Different frequency components have different K1 and K2 for fundamental frequency, K1 could be around 0.7~0.9, K2 could be 1.2~1.4; $3^{rd}$ harmonic component's corresponding K1 could be 0.2~0.4, K2 could be 0.3~0.5; 1/2, 1/3, 1/5 subharmonics' corresponding K1, K2 will be 1/2, 1/3, 1/5 of the value of fundamental components corresponding K1, K2. This is because by integration, the flux derived from 1/2, 1/3, 1/5 subharmonics will be 2, 3, 5 times of that derived by the fundamental frequency voltage when they are of the same amplitude.

The parameters of such a function are different for different components. For each column of the above matrix:
- if $C_1$ is large and $C_3$ is large too, then it's ferroresonance fundamental mode;
- if $C_1$ is large and $C_3$ is not large, then it's normal state;
- if $C_1$ is not large and $C_{1/2}$ is large, then it's ferroresonance 1/2 subharmonic mode;
- if $C_1$ is not large and $C_{1/3}$ is large, then it's ferroresonance 1/3 subharmonic mode;
- if $C_1$ is not large and $C_{1/5}$ is large, then it's ferroresonance 1/5 subharmonic mode;

The value of "not large" equals "1-large". A min fuzzy operator is used to obtain the antecedent. For example, if "$C_1$ is large" equals 0.2, "$C_3$ is large" equals 0.5, "$C_{1/3}$ is large" equals 0.9, and then the first "if-then" rule's antecedent is 0.2, the second rule gets 0.5, and the third rule gets 0.8.

The defuzzification works is such that a column is set to be the mode correspondent to the highest antecedent; if more than one rule with the highest antecedent, the column is set to be chaotic mode.

Among 20 columns, if there are more than 15 columns belonging to the same mode, this mode is verified.

3) The Adaptive Settings

An adaptive threshold is adjusting itself according to the amplitude/power conditions. If two phases' fluxes drop significantly, it indicates the line being deenergized. The overflux threshold is adjusted to a small value to increase the sensitivity.

DETAIL DESCRIPTION OF A PREFERRED EMBODIMENT

The invention is implemented into a sampling and alarming system as shown on FIG. 1. The block diagram of said invention system comprises successively:
a filter 10 receiving a voltage input,
an A/D converter 11,
a data storage 12,
a processor 13,
an amplifier 14,
an alarm output device 15, which outputs an alarm output. It also comprises an user interface 16 connected to the processor 13.

Basically, the invention system keeps sampling the three phases voltages. Also this system performs the algorithm, or invention method, in real time. In this embodiment, it executes the algorithm every half power cycle. The system is able to sample at the rate to exactly N points per power cycle (N=24 for example). The system frequency is set at 50 Hz or 60 Hz. The system is able to retrieve the history sample value at every execution point.

There are four stages for the algorithm: PREPARE, IDLE, START, and ALARM:
  the PREPARE stage is when first enabled for the input to full fill the voltage buffers,
  the IDLE stage is normally running stage, flux being monitored.
  the START stage is when a overflux is detected.
  the ALARM stage is when the ferroresonance mode is verified and the alarm is issued.

Figure 3:
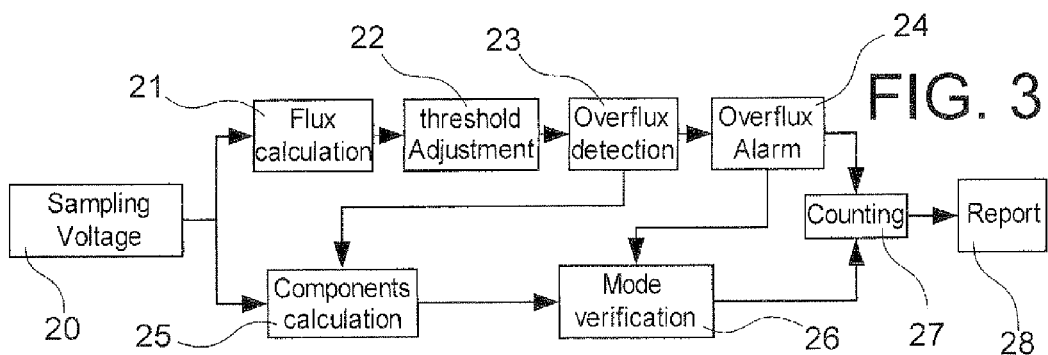
FIG. 3 is a diagram of the organization of invention method.

FIG. 3 shows the whole process of the invention method. It comprises the following steps:
  sampling voltage 20, and
  on a first way:
  flux calculation 21,
  threshold adjustment 22,
  overflux detection 23,
  overflux alarm 24,
  on a second way:
  component calculation 25,
  mode verification 26,
and then:
  counting 27,
  report 28.

1) Overflux Detection

The flux buffer utilizes a 144-points array corresponding to 6 fundamental power cycles, in order to minimize the interaction between the subharmonics. When 5 subharmonic ferroresonance happens, the flux calculation based on the 144 points cause some deviation which is acceptable.

Practically, the flux(n), its DC component $flux_{DC}$ and the magnitude Mag are calculated though discrete form:

$$\text{flux}(n) = \text{flux}(n-1) + u(n)\Delta t \quad (5)$$

$$flux_{DC} = \frac{1}{N}\sum_{n=1}^{N} \text{flux}(n) \quad (6)$$

$$\text{flux}(n) = \text{flux}(n) - flux_{DC} \quad (7)$$

$$Mag_\lambda = \sqrt{\frac{1}{N}\sum_{n=1}^{N} flux^2(n)} \quad (8)$$

In order to simplify the calculation, equation (5) and (8) are replaced by equation (9) and (10).

$$\text{flux}(n) = \text{flux}(n-1) + u(n); \quad (9)$$

Where U(n) is normalized voltage, and the initial value of flux is set to 0.

$$Mag_{flux} = \sqrt{\frac{1}{N}\sum_{n=1}^{N} flux^2(n) * Kn} \quad (10)$$

Where the constant Kn is used for normalization.

$$Kn = (1/Ncycle/Frequency/t_B)^3/\pi = 0.0057155766$$

When Ncycle=24 and system frequency is 50 Hz
$t_B$ is the base value of time which equals to $1/2\pi/Frequency$
When $Mag_{flux}$ is greater than the threshold, the algorithm enters the START stage.

2) Mode Verification

Once entered into the START stage, the invention method begins to calculate the components of the fundamental frequency, the 3rd harmonic, the 1/2 sub-harmonic, the 1/3 sub-harmonic, and the 1/5 sub-harmonic by DFT.

Three 144-points arrays are used to store the three voltages signals for the calculation of the 5 frequency components: fundamental component, $3^{rd}$ harmonic component, 1/2 sub-harmonic component, 1/3 subharmonic component, 1/5 sub-harmonic component. In order to minimize the interaction of the different frequency components in calculation by DFT, the components of 150 Hz, 50 Hz, 25 Hz and $16^{2/3}$ Hz are calculated at $8^{1/3}$ Hz basis, which need data of 6 fundamental cycles, i.e. 144 points. Only the 1/5 subharmonic frequency component is calculated at 10 Hz basis, corresponding to 5 fundamental cycles, i.e. 120 points. This compromise can be taken, because the interaction between 1/3, 1/2, 1/5 subharmonic calculations is not too big meanwhile the bandwidth consumed for the ferroresonance is acceptable.

Figure 4:
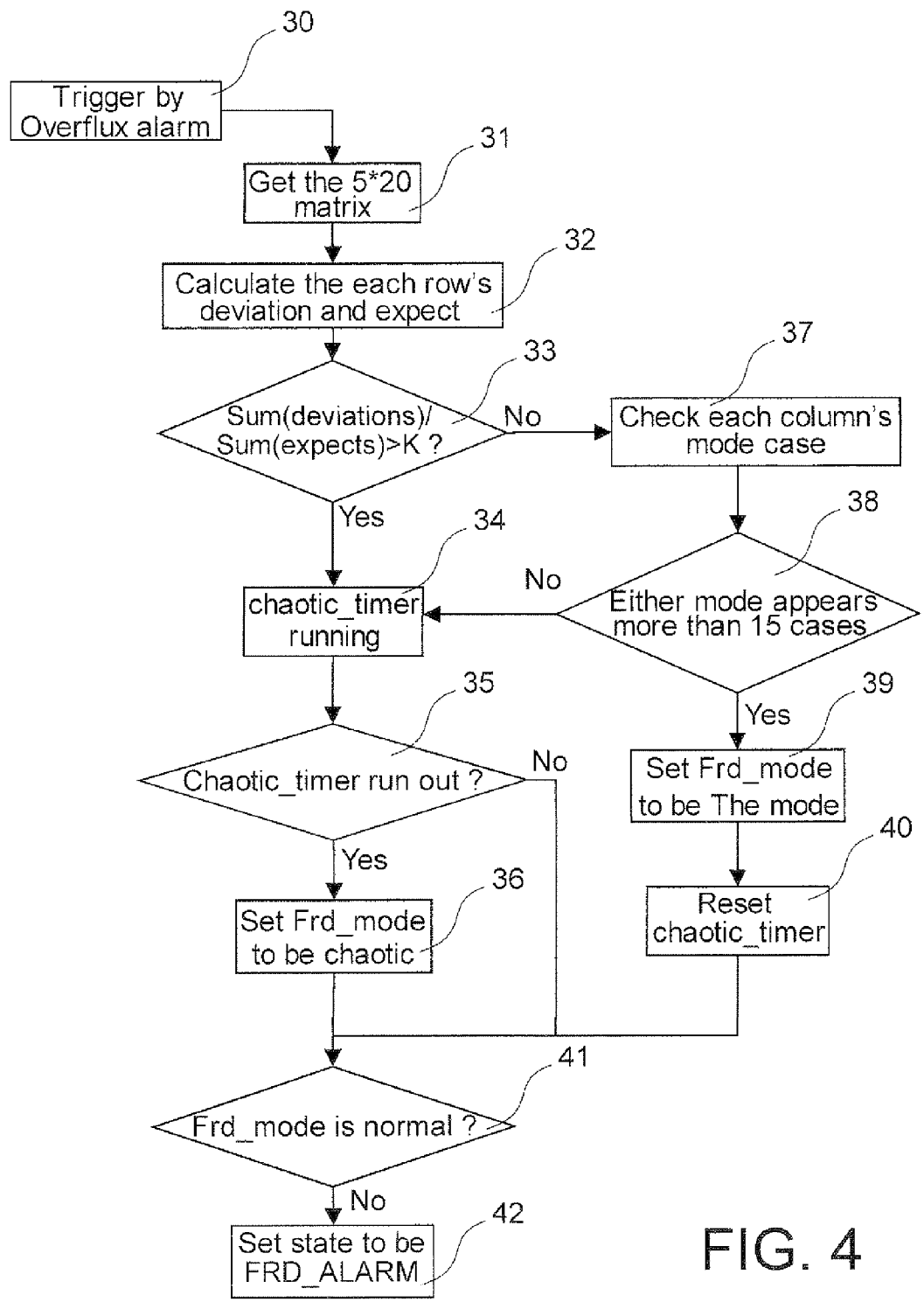
FIG. 4 is the diagram of the organization of the mode verification.

The overflux alarm starts the mode verification. The mode verification is carried out every 10 power cycles. Unless the mode verification gets the NORMAL results, an ferroresonance alarm (FRD-ALARM) is issued. The mode verification, as shown in the FIG. 4, comprises the following steps:
  trigger by overflux alarm (30),
  get the 5*20 matrix (31),
  calculate each row's deviation and expect (32),
  verify if sum (deviation)/sum (expects)>value K (33),
1) If "yes"
  chaotic-timer running (34),
  verify if chaotic-timer run out (35),
  a) if "yes"
  set FRD_mode (ferroresonance mode) to be chaotic (34),
2) If "no"
  check each column's mode case (37),
  verify either mode appears more than 15 cases (38),
  a) if "no" go to the previous step entitled "chaotic timer running",
  b) if "yes"
  set FRD_mode to be the searched mode (39),
  reset chaotic timer (40),
and then
  verify if FRD_mode is normal (41),
  a) if no
  set state to be FRD_alarm (42).

3) The Adaptive Settings

The flux is being monitored all the time. If two out of three phases' fluxes fall below a threshold, the transformer feeder is regarded as de-energized. At such situation, the threshold for the overflux and the mode verification are halved.

REFERENCES

[1] "Ferroresonance alarm relay type XR 309 (Fact sheet, Reyrolle protection, 1996, Roll-Royce)

The invention claimed is:

1. A method for detection of online ferroresonance and determination of a mode of the ferroresonance in a high voltage electrical distribution network, which comprises:
  overflux detection, which acts as a start element, overflux being set if the flux is greater than a threshold for a specified time duration,
  mode verification, which is to recognize the modes of the ferroresonance, wherein many frequency components are calculated when an overflux is detected, then many latest values of the frequency components are stored, a stable state or an unstable state being determined first by comparing the sum of the standard deviation of each frequency component and the sum of the expectations of each frequency component, wherein, if the state is unstable and lasts for a specified time duration, the chaotic mode is verified, and wherein if the state is stable, a fuzzy logic is applied to discriminate the ferroresonance modes.

2. The method according to claim 1, wherein said method is a method for online ferroresonance detection of power transformer ferroresonance.

3. The method according to claim 2 wherein the flux is being monitored all the time, wherein if two out of three phases fluxes fall below a threshold, the transformer feeder is regarded as de-energized, and wherein, at such situation, the threshold for overflux and mode verification is halved.

4. The method according to claim 1, wherein the flux is derived from integration of voltage with elimination of the DC component, and then compared to a determined threshold to determine whether there is overflux or not.

5. The method according to claim 1, wherein the frequency components are: 1/5 component, 1/3 component, 1/2 subharmonic component, fundamental component and $3^{rd}$ harmonic component.

6. The method according to claim 1, wherein the fuzzy logic uses a large membership function, each component's value at the same instance being fuzzified through said function, The rules being as follows:

If C1 is large and C3 is large too, then it's fundamental mode;

If C1 is large and C3 is not large, then it's normal state;

If C1 is not large and C1/2 is large, then it's 1/2 subharmonic mode;

If C1 is not large and C1/3 is large, then it's 1/3 subharmonic mode;

If C1 is not large and C1/5 is large, then it's 1/5 subharmonic mode;

C1, C3 being the components of fundamental and 3rd harmonic respectively; C1/2, C1/3, C1/5 being the components of 1/2, 1/3, 1/5 subharmonics respectively, wherein the value of "not large" equals "1-large", wherein the rules' antecedents are calculated by "MIN" operator, wherein the defuzzification is achieved by taking the corresponding mode of the rule with highest antecedent as the result; and wherein if more than one rules with the highest antecedent the result is chaotic mode.

7. The method according to claim 1, wherein a mode is verified if said mode takes place more than 15 times out of the latest values.

8. The method according to claim 1, which comprises the following steps:
sampling a measured voltage,
overflux detection,
overflux alarm, and
mode verification.

9. A system for online ferroresonance detection in a high voltage electrical distribution network, which comprises:
overflux detection means which acts as a start element, overflux being set if a flux is greater than a threshold for specified time duration, mode verification means to recognize modes of the ferroresonance, comprising means for calculating many frequency components when an overflux is detected, means for storing many latest values of the frequency components, a stable state or an unstable state being determined first by comparing the sum of the standard deviation of each frequency component and the sum of expectations of each frequency component, wherein, if the state is unstable and lasts for a specified time duration, the chaotic mode is verified, and wherein if the state is stable, a fuzzy logic is applied to discriminate the ferroresonance modes.

10. The system according to claim 9, wherein said system is a system for online ferroresonance detection of power transformer ferroresonance.

11. The system according to claim 10 further wherein the flux is being monitored all the time, wherein if two out of three phases fluxes fall below a threshold, the transformer feeder is regarded as de-energized, and wherein, at such situation, the threshold for overflux and mode verification is halved.

12. The system according to claim 9, comprising means for deriving the flux from integration of voltage with elimination of the DC component, and means for comparing it to a determined threshold to determine whether there is overflux or not.

13. The system according to claim 9, wherein the frequency components are: 1/5 component, 1/3 component, 1/2 subharmonic component, fundamental component and $3^{rd}$ harmonic component.

14. The system according to claim 9, wherein the fuzzy logic means use a large membership function, each component's value at the same instance being fuzzified through said function, The rules being as follows:

If C1 is large and C3 is large too, then it's fundamental mode;

If C1 is large and C3 is not large, then it's normal state;

If C1 is not large and C1/2 is large, then it's 1/2 subharmonic mode;

If C1 is not large and C1/3 is large, then it's 1/3 subharmonic mode;

If C1 is not large and C1/5 is large, then it's 1/5 subharmonic mode;

C1, C3 being the components of fundamental and 3rd harmonic respectively; C1/2, C1/3, C1/5 being the components of 1/2, 1/3, 1/5 subharmonics respectively, wherein the value of "not large" equals "1-large", wherein the rules' antecedents is calculated by "MIN" operator, wherein the defuzzification is achieved by taking the corresponding mode of the rule with highest antecedent as the result; and wherein if more than one rules with the highest antecedent the result is chaotic mode.

15. The system according to claim 9, wherein one mode is verified if said mode takes place more than 15 times out of the latest values.

* * * * *

UNITED STATES PATENT AND TRADEMARK OFFICE
CERTIFICATE OF CORRECTION

PATENT NO.        : 9,246,326 B2
APPLICATION NO.   : 13/701194
DATED             : January 26, 2016
INVENTOR(S)       : Xinshou Dong Page 1 of 1

It is certified that error appears in the above-identified patent and that said Letters Patent is hereby corrected as shown below:

In the Specification:

Column 3, line 31, please replace "a system for electrical" with -- a system for online ferroresonance detection in a high voltage electrical --

Signed and Sealed this
Twenty-eighth Day of June, 2016

Michelle K. Lee
*Director of the United States Patent and Trademark Office*